(12) United States Patent
Ikeda et al.

(10) Patent No.: US 9,828,507 B2
(45) Date of Patent: Nov. 28, 2017

(54) PRINTING INK COMPOSITION

(71) Applicant: Seiko Epson Corporation, Tokyo (JP)

(72) Inventors: Yasunari Ikeda, Shiojiri (JP); Akio Ito, Matsumoto (JP)

(73) Assignee: Seiko Epson Corporation (JP)

( * ) Notice: Subject to any disclaimer, the term of this patent is extended or adjusted under 35 U.S.C. 154(b) by 185 days.

(21) Appl. No.: 14/854,368

(22) Filed: Sep. 15, 2015

(65) Prior Publication Data

US 2016/0075879 A1    Mar. 17, 2016

(30) Foreign Application Priority Data

Sep. 16, 2014 (JP) .................. 2014-187762

(51) Int. Cl.
| | | |
|---|---|---|
| *C09D 11/328* | (2014.01) | |
| *C09B 56/00* | (2006.01) | |
| *C09B 29/036* | (2006.01) | |
| *C09B 1/16* | (2006.01) | |
| *C09B 29/16* | (2006.01) | |
| *C09D 11/38* | (2014.01) | |
| *C09B 67/22* | (2006.01) | |

(52) U.S. Cl.
CPC .............. *C09B 56/005* (2013.01); *C09B 1/16* (2013.01); *C09B 29/0037* (2013.01); *C09B 29/0048* (2013.01); *C09B 29/16* (2013.01); *C09B 67/0033* (2013.01); *C09D 11/328* (2013.01); *C09D 11/38* (2013.01)

(58) Field of Classification Search
CPC .............................. C09D 11/328; C09D 11/38
See application file for complete search history.

(56) References Cited

U.S. PATENT DOCUMENTS

| | | |
|---|---|---|
| 4,689,078 A | 8/1987 | Koike et al. |
| 2002/0144626 A1 | 10/2002 | Schut |
| 2007/0107626 A1 | 5/2007 | Chevli |
| 2009/0021568 A1 | 1/2009 | Xu |
| 2015/0130881 A1 | 5/2015 | Oguchi et al. |

FOREIGN PATENT DOCUMENTS

| | | |
|---|---|---|
| EP | 0202656 A2 | 11/1986 |
| EP | 1010802 A2 | 6/2000 |
| JP | 5006684 B2 | 8/2012 |

OTHER PUBLICATIONS

Extended European Search Report for Application No. EP 15 18 3933 dated Feb. 10, 2016 (6 pages).
Extended European Search Report for Application No. EP 15 18 3936 dated Feb. 10, 2016 (6 pages).

*Primary Examiner* — Veronica F Faison
(74) *Attorney, Agent, or Firm* — Harness, Dickey & Pierce, P.L.C.

(57) ABSTRACT

A printing ink composition includes a disperse dye, a surfactant, a water soluble dye, and a dispersant, in which an IOB value A of the disperse dye, an IOB value B of the surfactant, and an IOB value C of the water soluble dye satisfy the following Equation (1), A<B<C (1), and the IOB value B is 1.0 to 2.0.

4 Claims, No Drawings

PRINTING INK COMPOSITION

BACKGROUND

1. Technical Field

The present invention relates to a textile printing ink composition.

2. Related Art

An ink jet recording method is a method which can record a high definition image with a relatively simple apparatus, and it has been rapidly developed in various aspects. Among the aspects, study on the dispersion stability of a color material, or the like has been performed in various ways. For example, for the purpose of providing an ink having excellent stability, Japanese Patent No. 5,006,684 discloses an ink for ink jet comprising one or two or more types of a disperse dye, one or two or more types of a water soluble dye, and one or two or more types of a dispersant, in which a difference between an inorganic/organic value of the dispersant and an inorganic/organic value of the disperse dye is 0 to 1, and a difference between an inorganic/organic value of the dispersant and an inorganic/organic value of the water soluble dye is 2 or more.

However, since the ink composition disclosed in Japanese Patent No. 5,006,684 does not contain a surfactant, there is a problem that bleed resistance of the obtained recorded matter is degraded. Meanwhile, in a case where a plurality of components having different inorganic/organic values (IOB value described below) exist in a complicated state because the surfactant is simply added, there is a problem that stability of the dispersed color material is degraded, and a particle diameter of the dispersed components changes over time. In addition, as the stability of the dispersed components is degraded, there is a problem that nozzle clogging easily occurs, and the continuous printing stability is degraded.

SUMMARY

An advantage of some aspects of the invention is to provide a textile printing ink composition having excellent dispersion stability and bleed resistance of the obtained recorded matter.

The inventors studied thoroughly in order to solve the above mentioned problems. As a result, the inventors found out that the ink composition having predetermined components can solve the above mentioned problems, and completed the invention.

Specifically, the invention is described as follows.

[1] A printing ink composition including: a disperse dye; a surfactant; a water soluble dye; and a dispersant, and in which an IOB value A of the disperse dye, an IOB value B of the surfactant, and an IOB value C of the water soluble dye satisfy the following Equation (1), A<B<C (1), and the IOB value B is 1.0 to 2.0.

[2] In the printing ink composition according to [1], the surfactant includes two or more types of surfactants, and a difference between the maximum IOB value B1 and the minimum IOB value B2 of the IOB values B which the two or more types of surfactants have is 0.10 to 1.0.

[3] In the printing ink composition according to [1] or [2], a difference between the IOB value B and the IOB value A is at least 1.0 or less.

[4] In the printing ink composition according to any one of [1] to [3], the dispersant includes at least any one of a formalin condensate of a lignin sulfonic acid and a formalin condensate of a naphthalene sulfonic acid compound.

[5] In the printing ink composition according to any one of [1] to [4], the surfactant includes a nonionic surfactant.

DESCRIPTION OF EXEMPLARY EMBODIMENTS

Hereinafter, an embodiment of the invention (hereinafter, referred to as "the embodiment") is described in detail. However, the invention is not limited thereto, and various modifications can be made within the scope not departing from the gist of the invention.

Printing Ink Composition

A printing ink composition of the embodiment includes a disperse dye, a surfactant, a water soluble dye, and a dispersant. An IOB value A of the disperse dye, an IOB value B of the surfactant, and an IOB value C of the water soluble dye satisfy the following Equation (1), and the IOB value B is 1.0 to 2.0.

$$A<B<C \tag{1}$$

When a composite material (recording medium) in which two or more types of fibers are mixed is dyed, it is preferable to use a dye adapted for each of the fibers. In this case, a dyeing method is exemplified in which a plurality of heads accommodating two or more types of dye separately, for example, an ink composition containing a disperse dye and an ink composition containing a water soluble dye are used. However, in this case, since the number of the heads increases, there is a problem that the size and cost of a recording apparatus are increased.

Therefore, it is preferable to use an ink composition containing a disperse dye and a water soluble dye at the same time, from a viewpoint of the recording apparatus, and obtaining high quality recorded matter.

However, in the ink composition containing the disperse dye and the water soluble dye at the same time, there is a problem that a dispersion system of the disperse dye collapses and stability cannot be obtained. Further, use of a dispersant is considered from a viewpoint of stabilizing the dispersion system of the disperse dye. However, since the dispersant generally has a weak decreasing ability of surface tension, there is a tendency that permeability to the recording medium is degraded only by using the dispersant. In addition, due to the above, there is a problem that a bleed occurs in the obtained recorded matter, and thus high quality recorded matter cannot be obtained. In particular, a problem of the bleed becomes remarkable when plural types of the ink compositions are used.

With regard to this, since the ink composition of the embodiment has the above mentioned configuration, the ink composition has both excellent dispersion stability and bleed resistance. In particular, since the ink composition easily wet-spreads on the recording medium in a surface direction more easily than it permeates (wets) the recording medium in a perpendicular direction of the surface (permeation direction), the bleed occurring on the recorded matter is suppressed.

An "IOB value" is a value obtained by dividing an inorganic value (IV; Inorganic Value) by an organic value (OV; Organic Value) based on an organic conceptual diagram. The organic conceptual diagram is a diagram in which two factors of an organic (covalent) value based on a carbon number and an inorganic (ion binding) value based on a substituted group are mapped on an orthogonal coordinate named as an organic axis and an inorganic axis, and is known as one of the indices predicting properties of organic compounds.

The IOB value (Inorganic/Organic Balance value, ratio of inorganic to organic) can be calculated based on a method disclosed on pages 66 to 70 of "Theoretical Chemistry of Dyeing" published by Maki Shoten and edited by KUROKI Nobuhiko (a numerical value is obtained based on a "calculation example" by using 3.3 Table "numerical value of inorganic group"). One carbon atom value is set to 20 for the organic value, one hydroxyl group value is set to 100 for the inorganic value, and the organic value and the inorganic value of other substitution groups are determined based on the above. In addition, in the specification, the HLB value is a value calculated by using the following Equation disclosed in "Synthesis of Surfactant and Application thereof" (ODA and TERAMURA, Maki Shoten (1957), page 501).

$$HLB \text{ value} = [(\Sigma \text{ inorganic value})/(\Sigma \text{ organic value})] \times 10$$

Disperse Dye

A disperse dye is a dye existing in a dispersed state in the ink composition without being dissolved.

An IOB value A of a disperse dye is smaller than an IOB value B of a surfactant described below. When this relationship is satisfied, there is a tendency that recorded matter having excellent bleed resistance can be obtained while improving dispersibility of the disperse dye. In addition, when two or more types of surfactants are included, and the two or more types of surfactants have the IOB values B including a maximum IOB value B1 and a minimum IOB value B2, the IOB value A of the disperse dye is smaller than the IOB value B2.

The IOB value A is preferably 0.70 to 1.45, more preferably 0.80 to 1.35, and still more preferably 0.90 to 1.25. When the IOB value A is 0.70 or more, there is a tendency that affinity (=dispersion stability) with the surfactant is further improved. In addition, when the IOB value A is 1.45 or less, there is a tendency that affinity (=dispersion stability) with surfactant is further improved. In addition, in a case where a plurality of disperse dyes are contained, all the disperse dyes preferably satisfy the Equation (1) mentioned above.

The examples of the disperse dye which can be used in the embodiment are as follows.

A yellow disperse dye is not particularly limited, and for example, C.I. Dispers Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, 232, or the like can be exemplified.

An orange disperse dye is not particularly limited, and for example, C.I. Dispers Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, 142, or the like can be exemplified.

A magenta disperse dye is not particularly limited, and for example, C.I. Dispers Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 167:1, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, 328, or the like can be exemplified.

A violet disperse dye is not particularly limited, and, for example, C.I. Dispers Violet 1, 4, 8, 23, 26, 27, 28, 31, 33, 35, 36, 38, 40, 43, 46, 48, 50, 51, 52, 56, 57, 59, 61, 63, 69, 77, or the like can be exemplified.

A green disperse dye is not particularly limited, and, for example, C.I. Dispers Green 9, or the like can be exemplified.

A brown disperse dye is not particularly limited, and, for example, C.I. Dispers Brown 1, 2, 4, 9, 13, 19, or the like can be exemplified.

A blue disperse dye is not particularly limited, and, for example, C.I. Dispers Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, 360, or the like can be exemplified.

A black disperse dye is not particularly limited, and, for example, C.I. Dispers black 1, 3, 10, 24, or the like can be exemplified.

A content of the disperse dye is preferably 0.5 mass % to 15 mass % with respect to a total amount of the ink composition, more preferably 1 mass % to 10 mass %. When a content of the disperse dye is 1 mass % or more, there is a tendency that color development is further improved. In addition, when a content of the disperse dye is 10 mass % or less, there is a tendency that foreign matter derived from the coagulation of the disperse dye is hardly generated.

Surfactant

A surfactant is not particularly limited, and, for example, nonionic surfactant, acethylenic surfactant, fluorine-based surfactant, and silicone-based surfactant can be exemplified. Among the above, the nonionic surfactant is preferable, and polyoxyethylene (POE) group-containing surfactant is more preferable. When the surfactant is included, there is a tendency that storage properties are further improved.

The nonionic surfactant is not particularly limited, and, for example, ether-based surfactants such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether; ester-based surfactants such as polyoxyethylene oleate, polyoxyethylene distearate, sorbitan laurate, sorbitan monostearate, sorbitan monooleate, sorbitan sesquioleate, polyoxyethylene monooleate, polyoxyethylene stearate; or the like can be exemplified.

An acetylene glycol-based surfactant is not particularly limited, and, for example, at least one type selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyne-4-ol and 2,4-dimethyl-5-decyne-4-ol is preferable. A commercially available product of the acetylene glycol-based surfactant is not particularly limited, and, for example, E series such as Olfine 104 series, Olfine E1010, or the like (trade names, manufactured by Air Products Japan, Inc.), Surfynol 465, Surfynol 61 (trade names, manufactured by Nissin Chemical Industry CO., Ltd.), or the like can be exemplified. The acetylene glycol-based surfactant may be used singly, or two or more types thereof may be used in combination.

The fluorine-based surfactant is not particularly limited, and, for example, perfluoroalkyl sulfonate, perfluoroalkyl carboxylate, perfluoroalkyl phosphate, a perfluoroalkyl ethylene oxide adduct, perfluoroalkyl betaine, and a perfluoroalkylamine oxide compound can be exemplified. A commercially available product of the fluorine-based surfactant is not particularly limited, and, for example, S-144, S-145 (manufactured by Asahi Glass Co., Ltd.); FC-170C, FC-430, Fluorad-FC4430 (manufactured by Sumitomo 3M Limited); FSO, FSO-100, FSN, FSN-100, FS-300 (manufactured by Dupont); FT-250, 251 (NEOS Company Limited); or the like can be exemplified. The fluorine-based surfactant may be used singly, or two or more types thereof may be used in combination.

As the silicone-based surfactant, a polysiloxane-based compound, a polyether modified organosiloxane, or the like can be exemplified. A commercially available product of the silicone-based surfactant is not particularly limited, and, specifically, BYK-306, BYK-307, BYK-333, BYK-341, BYK-345, BYK-346, BYK-347, BYK-348, BYK-349 (all of the above are trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of the above are trade names, manufactured by Shin-Etsu Chemical Co., Ltd), or the like can be exemplified.

A content of the surfactant is preferably 0.5 mass % to 15 mass % with respect to a total amount of the ink composition, and is further preferably 1 mass % to 10 mass %. When the content of the surfactant is within the above mentioned range, there is a tendency that the recorded matter having excellent bleed resistance can be obtained while improving dispersibility of the disperse dye.

Two or more types of the above mentioned surfactant may be preferably used. When two or more types of the surfactant are included, there is a tendency that the recorded matter having excellent bleed resistance can be obtained while improving dispersibility of the disperse dye. As the specific combination, a combination of the acetylene glycol-based surfactant and other acetylene glycol-based surfactants, a combination of the fluorine-based surfactant and other fluorine-based surfactants, a combination of the silicone-based surfactant and other silicone-based surfactants, a combination of the acetylene glycol-based surfactant and the fluorine-based surfactant, a combination of the acetylene glycol-based surfactant and the silicone-based surfactant, and a combination of the fluorine-based surfactant and the silicone-based surfactant can be exemplified.

The IOB value B is 1.0 to 2.0, preferably 1.1 to 2.0, and more preferably 1.2 to 2.0. When the IOB value B is 1.0 or more, compatibility with a solvent is further improved. In addition, when the IOB value B is 2.0 or less, dispersibility of the disperse dye is further improved.

When two or more types of surfactants are included, the IOB value B may have a plurality of values. In this case, a relationship between the IOB value B1 (maximum value of the IOB value B), the IOB value B2 (minimum value of the IOB value B), and other IOB values is as shown in Equation (2).

$$A<B2<B1<C \quad (2)$$

The IOB value B1 is preferably 1.80 to 2.00. When the IOB value B1 is 1.80 or more, there is a tendency that bleed resistance is further improved. In addition, when the IOB value B1 is 2.00 or less, there is a tendency that the continuous printing stability is further improved.

The IOB value B2 is preferably 1.0 to 1.7, more preferably 1.1 to 1.7, and still more preferably 1.2 to 1.7. When the IOB value B2 is 1.0 or more, there is a tendency that compatibility with a solvent is further improved. In addition, when the IOB value B2 is 1.7 or less, there is a tendency that dispersibility of the disperse dye is further improved.

A difference between the IOB value B1 and the IOB value B2 is preferably 0.10 to 1.0, more preferably 0.10 to 0.90, and still more preferably 0.10 to 0.80. When the difference between the IOB value B1 and the IOB value B2 is 0.10 or more, there is a tendency that bleed resistance is further improved. In addition, when the difference between the IOB value B1 and the IOB value B2 is 1.0 or less, there is a tendency that the continuous printing stability during is further improved.

A difference between the IOB value B and the IOB value A is preferably at least 1.0 or less. Specifically, in a case where one type of the surfactant is used, the difference between the IOB value B and the IOB value A is preferably 0.10 to 1.0, more preferably 0.10 to 0.90, and still more preferably 0.15 to 0.80. When the difference between the IOB value B and the IOB value A is 0.10 or more, there is a tendency that bleed resistance is further improved. In addition, when the difference between the IOB value B and the IOB value A is 1.0 or less, there is a tendency that the continuous printing stability is further improved.

In addition, when two or more types of the surfactant are used, a difference between IOB value B2 and the IOB value A is preferably 0.10 to 1.0, more preferably 0.10 to 0.90, and still more preferably 0.15 to 0.80. When the difference between the IOB value B2 and the IOB value A is 0.10 or more, there is a tendency that bleed resistance is further improved. In addition, when the difference between the IOB value B2 and the IOB value A is 1.0 or less, there is a tendency that the continuous printing stability is further improved.

Water Soluble Dye

A water soluble dye is a dye existing in the ink composition in a dissolved state, which is a distinguishable point from the disperse dye. The water soluble dye is not particularly limited, and, for example, the following can be exemplified.

A yellow water soluble dye is not particularly limited, and, for example, reactive dyes such as C.I. Reactive Yellow 2, 3, 7, 13, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176; acidic dyes such as C.I. Acid Yellow 1, 3, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, 246, or the like can be exemplified.

A magenta water soluble dye is not particularly limited, and, for example, reactive dyes such as C.I. Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, 235; acidic dyes such as C.I. Acid Red 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, or the like can be exemplified.

A cyan water soluble dye is not particularly limited, and, for example, C.I. Direct Blue 87 can be exemplified.

An orange water soluble dye is not particularly limited, and, for example, reactive dyes such as C.I. Reactive Orange 1, 4, 5, 7, 11, 12, 13, 15, 16, 20, 30, 35, 56, 64, 67, 69, 70, 72, 74, 82, 84, 86, 87, 91, 92, 93, 95, 107; acidic dyes such as C.I. Acid Orange 3, 7, 8, 10, 19, 22, 24, 51, 51S, 56, 67, 74, 80, 86, 87, 88, 89, 95, 107, 108, 116, 122, 127, 140, 142, 144, 149, 152, 156, 162, 166, 168, or the like can be exemplified.

A blue water soluble dye is not particularly limited, and, for example, reactive dyes such as C.I. Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236, C.I. Reactive Violet 1, 2, 4, 5, 6, 22, 23, 33, 36, 38; acidic dyes such as C.I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, 350, C.I. Acid Violet 17, 19, 21, 42, 43, 47, 48, 49, 54, 66, 78, 90, 97, 102, 109, 126, or the like can be exemplified.

A content of the water soluble dye is preferably 0.1 mass % to 15 mass % with respect to a total amount of the ink composition, and more preferably 1 mass % to 10 mass %. When a content of the water soluble dye is 1 mass % or more, there is a tendency that color development is further improved. In addition, when a content of the disperse dye is 10 mass % or less, there is a tendency that the continuous printing stability is further improved.

The IOB value C is preferably 3.9 to 5.6, more preferably 4.1 to 5.4, and still more preferably 4.3 to 5.2. When the IOB value C is 3.9 or more, there is a tendency that bleed resistance is further improved. In addition, when the IOB value C is 5.6 or less, there is a tendency that the continuous printing stability is further improved. In addition, in a case where a plurality of the water soluble dyes are contained, all the water soluble dyes preferably satisfy the Equation (1) mentioned above.

In a case where one type of the surfactant is used, a difference between the IOB value C and the IOB value B is preferably 2.3 to 4.1, more preferably 2.5 to 3.9, and still more preferably 2.7 to 3.7. When the difference between the IOB value C and the IOB value B is 2.3 or more, there is a tendency that bleed resistance is further improved. In addition, when the difference between the IOB value C and the IOB value B is 4.1 or less, there is a tendency that the continuous printing stability is further improved.

In a case where two or more types of the surfactants are used, a difference between the IOB value C and the IOB value B1 is preferably 2.3 to 4.1, more preferably 2.5 to 3.9, and still more preferably 2.7 to 3.7. When the difference between the IOB value C and the IOB value B1 is 2.3 or more, there is a tendency that bleed resistance is further improved. In addition, when the difference between the IOB value C and the IOB value B1 is 4.1 or less, there is a tendency that the continuous printing stability is further improved.

Dispersant

The dispersant is not particularly limited, and, for example, an anionic dispersant, a nonionic dispersant, and a polymeric dispersant can be exemplified. Among the above, the anionic dispersant is preferable. When the dispersant is used, there is a tendency that storage properties are further improved, and dyeing efficiency is improved more than in the case of using a fabric as a recording medium.

The anionic dispersant is not particularly limited, and, for example, a formalin condensate of an aromatic sulfonic acid can be exemplified.

The aromatic sulfonic acid is not particularly limited, and, for example, a benzene sulfonic acid compound such as creosote oil sulfonate, cresol sulfonic acid, phenol sulfonic acid, lignin sulfonic acid; alkyl naphthalene sulfonic acid such as β-naphthol sulfonic acid, β-naphthalene sulfonic acid, methyl naphthalene sulfonic acid, butyl naphthalene sulfonic acid; a naphthalene sulfonic acid compound such as a mixture of β-naphthalene sulfonic acid and β-naphthol sulfonic acid, a mixture of cresol sulfonic acid and 2-naphthol-6-sulfonic acid, or the like can be exemplified.

Among the above, it is preferable to include at least any one of the formalin condensate of the lignin sulfonic acid and the formalin condensate of the naphthalene sulfonic acid compound. When a dispersant is used, there is a tendency that dispersibility of the disperse dye is further improved.

The nonionic dispersant is not particularly limited, and, for example, an ethylene oxide adduct of phytosterol, an ethylene oxide adduct of cholestanol, or the like can be exemplified.

The polymeric dispersant is not particularly limited, and, for example, a partial alkyl ester of polyacrylic acid, polyalkylene polyamine, polyacrylate, a styrene-acrylic acid copolymer, a vinyl naphthalene-maleic acid copolymer, or the like can be exemplified.

A content of the dispersant is preferably 30 mass % to 200 mass % with respect to a total amount of the dye included in the ink composition, and more preferably 50 mass % to 150 mass %. When the content of the dispersant is within the range mentioned above, there is a tendency that dispersion stability and the continuous printing stability are further improved.

The IOB value D of the dispersant is preferably 1.9 to 6.0, more preferably 2.1 to 5.8, and still more preferably 2.3 to 5.6. When the IOB value D is 1.9 or more, there is a tendency that solvent compatibility is further improved. In addition, when the IOB value D is 6.0 or less, there is a tendency that compatibility with the disperse dye is further improved.

A difference between the IOB value D and the IOB value A is preferably 0.60 to 5.0, more preferably 0.80 to 4.8, and still more preferably 1.0 to 4.6. When the difference between the IOB value D and the IOB value A is 0.60 or more, there is a tendency that balance between the solvent compatibility and the compatibility with the disperse dye is further improved. In addition, when the difference between the IOB value D and the IOB value A is 5.0 or less, there is a tendency that the compatibility with disperse dye is further improved.

A difference between the IOB value C and the IOB value D is preferably −1.6 to 3.7, more preferably −1.4 to 3.5, and still more preferably −1.2 to 3.3. When the difference between the IOB value C and the IOB value D is −1.6 or more, there is a tendency that compatibility with the disperse dye is further improved. In addition, when the difference between the IOB value C and the IOB value D is 3.7 or less, there is a tendency that the solvent compatibility is further improved.

Other Components

In the ink composition of the embodiment, various additives such as a dissolution aid, a viscosity modifier, a pH adjuster, an antioxidizing agent, a preservative, an antifungal agent, a corrosion inhibitor, a chelating agent for obtaining metal ions which affect dispersion, or the like can be added appropriately.

Recording Medium

A recording medium to which the ink composition of the embodiment can be applied is not particularly limited, and, for example, a fabric can be exemplified. The fabric is not particularly limited, and, for example, a fabric configured by only natural fibers such as silk, cotton, wool, and rayon, or synthetic fibers such as nylon, polyester, diacetate, triacetate, a fabric configured by mixing two or more types of the natural fibers, or mixing two or more types of the synthetic fibers, and a fabric configured by mixing at least one type of the natural fibers and at least one type of the synthetic fibers can be exemplified. Among the above, a fabric configured by mixing two or more types of the natural fibers, a fabric configured by mixing two or more types of the synthetic fibers, and a fabric configured by mixing at least one type of the natural fibers and at least one type of the synthetic fibers are preferable. The mixed fabric includes two or more types of fibers having different dyeing properties, and plural types of the ink composition are preferably used in order to obtain a high quality image. Therefore, the ink composition of the embodiment is particularly useful.

EXAMPLES

Hereinafter, Examples and Comparative Examples of the invention are described in detail. The invention is not limited to the following Examples at all.
Materials for Ink Composition
Main materials for the ink composition used in the following Examples and Comparative Examples are as follows.
Disperse Dye
Y114 (C.I. Dispers Yellow 114)
B165 (C.I. Dispers Blue 165)
R167:1 (C.I. Dispers Red 167:1)
Surfactant
Surfactant 1: Newcol N1004 (manufactured by Nippon Shokubai Co., Ltd., IOB value: 1.3, polyoxyethylene 2-ethylhexyl ether)
Surfactant 2: Newcol N1006 (manufactured by Nippon Shokubai Co., Ltd., IOB value: 1.4, polyoxyethylene 2-ethylhexyl ether)
Surfactant 3: Newcol N1020 (manufactured by Nippon Shokubai Co., Ltd., IOB value: 1.7, polyoxyethylene 2-ethylhexyl ether)
Surfactant 4: Newcol N2399s (manufactured by Nippon Shokubai Co., Ltd., IOB value: 1.8, polyoxyethylene alkylether)
Surfactant 5: Newcol N210 (manufactured by Nippon Shokubai Co., Ltd., IOB value: 2.0, dedecyl benzene sulfonate)
Surfactant 6: surfactant (IOB value: 2.4) represented by the following formula (1)

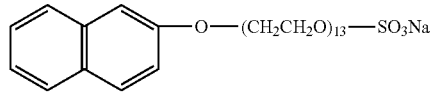

(1)

Water Soluble Dye
Y2 (C.I. Reactive Yellow 2)
Y13 (C.I. Reactive Yellow 13)
B49 (C.I. Reactive Blue 49)
R24 (C.I. Reactive Red 24)
Dispersant
Dispersant 1: refer to the following (IOB value: 1.85) (Ph=phenyl group)
Dispersant 2: refer to the following (IOB value: 2.40)
Dispersant 3: refer to the following (IOB value: 3.70)
Dispersant 4: refer to the following (IOB value: 5.48)
Dispersant 5: refer to the following (IOB value: 5.50)

Dispersant 1

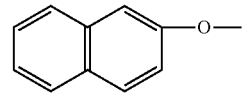

Dispersant 2

Dispersant 3

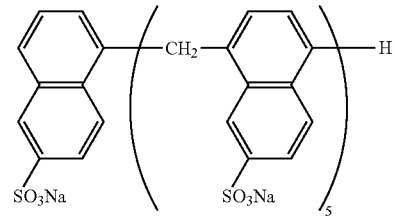

Dispersant 4

H—(CH$_2$—CH(Ph)—CH(OCONa)—CH(OCONa))$_n$—H (n: 10~20)

Dispersant 5

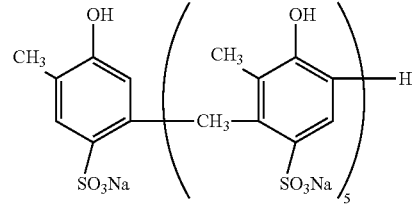

Moisturizing Agent
Glycerin
pH Adjuster
Triethanolamine
Preparation of Ink Composition
Each of the materials were mixed according to a composition shown in Table described below, and stirred sufficiently, thereby obtaining each ink composition. In addition, a unit of the numerical value in the Table described below is mass %, and a sum of the values is 100.0 mass %.

TABLE

| | | Example 1 | Example 2 | Example 3 | Example 4 | Example 5 | Example 6 | Comparative Example 1 | Comparative Example 2 |
|---|---|---|---|---|---|---|---|---|---|
| Disperse dye | Type | Y114 | B165 | R167:1 | Y114 | Y114 | B165 | R167:1 | Y114 |
| | IOB value A | 1.24 | 0.93 | 0.93 | 1.24 | 1.24 | 0.93 | 0.93 | 1.24 |
| | Content | 2.00 | 4.00 | 4.00 | 2.00 | 2.00 | 4.00 | 4.00 | 2.00 |
| Surfactant | Type | 2 | 1 | 3 | 2 | 2 | 1 | — | — |
| | IOB value B2 | 1.40 | 1.30 | 1.70 | 1.40 | 1.40 | 1.30 | — | — |
| | Content | 3.00 | 3.00 | 5.00 | 5.00 | 5.00 | 3.00 | — | — |

TABLE-continued

|  |  | Example 1 | Example 2 | Example 3 | Example 4 | Example 5 | Example 6 | Comparative Example 1 | Comparative Example 2 |
|---|---|---|---|---|---|---|---|---|---|
|  | Type | 4 | 4 | 4 | 5 | — | 6 | 6 | — |
|  | IOB value B1 | 1.80 | 1.80 | 1.80 | 2.00 | — | 2.40 | 2.40 | — |
|  | Content | 5.00 | 5.00 | 5.00 | 5.00 | — | 5.00 | 5.00 | — |
| Water soluble dye | Type | Y2 | B49 | R24 | Y13 | Y2 | B49 | R24 | Y13 |
|  | IOB value C | 4.70 | 4.40 | 5.10 | 5.60 | 4.70 | 4.40 | 5.10 | 5.60 |
|  | Content | 2.00 | 4.00 | 4.00 | 2.00 | 2.00 | 4.00 | 4.00 | 2.00 |
| Dispersant | Type | 3 | 5 | 4 | 2 | 3 | 5 | 4 | 1 |
|  | IOB value D | 3.70 | 5.50 | 5.48 | 2.40 | 3.70 | 5.50 | 5.48 | 1.85 |
|  | Content | 2.00 | 4.00 | 4.00 | 2.00 | 2.00 | 4.00 | 4.00 | 2.00 |
| Moisturizing agent | glycerin | 10 | 10 | 10 | 10 | 10 | 10 | 10 | 10 |
| pH adjuster | Triethanolamine | 0.5 | 0.5 | 0.5 | 0.5 | 0.5 | 0.5 | 0.5 | 0.5 |
| Water |  | Residue | Residue | Residue | Residue | Residue | Residue | Residue | Residue |
| IOB value B2 – IOB value A |  | 0.16 | 0.37 | 0.77 | 0.16 | 0.16 | 0.37 | — | — |
| IOB value B1 – IOB value B2 |  | 0.40 | 0.50 | 0.10 | 0.60 | — | 1.10 | — | — |
| IOB value C – IOB value B1 |  | 2.90 | 2.60 | 3.30 | 3.60 | — | 2.00 | 2.70 | — |
| IOB value D – IOB value A |  | 2.46 | 4.57 | 4.55 | 1.16 | 2.46 | 4.57 | 4.55 | 0.61 |
| IOB value C – IOB value D |  | 1.00 | −1.10 | −0.38 | 3.20 | 1.00 | −1.10 | −0.38 | 3.75 |
| Particle diameter change |  | A | A | A | A | A | B | C | A |
| Continuous printing stability |  | A | A | A | B | B | B | C | C |
| Bleed resistance |  | A | A | B | A | B | B | C | C |

Dispersion Stability: Change in Particle Diameter

A volume average particle diameter (D50) of particles in each of the obtained ink compositions before placement and a volume average particle diameter (D50) of particles in the ink composition after placement at a temperature of 60° C. for 5 days were compared with each other. The volume average particle diameter (D50) was measured by using Microtrac UPA-150, and the ink composition was diluted 1000 times to be used as a sample. The particle diameter before placement was set to 100%, and the particle diameter after placement was calculated. Dispersion stability was evaluated according to the evaluation criteria described below.

Evaluation Criteria
A: Less than 120%
B: Equal to or more than 120% and less than 150%
C: 150% or more Continuous Printing Stability Each of the ink compositions was adhered to a photo paper (trade name, Photo Paper <Glossy>) at room temperature by using a printer of Seiko Epson Corp. (trade name PX-G930) to form a solid pattern at a resolution of 720 dpi×720 dpi. In the same manner, after 20 pieces of paper were continuously printed, dot omission was visually observed, and a ratio of the dot omission was calculated to evaluate the continuous printing stability according to the evaluation criteria described below.

Evaluation Criteria
A: No nozzle omission
B: Less than 20% of nozzle omission
C: 20% or more of nozzle omission Bleed Resistance Each of the ink composition was adhered to a mixed fabric (polyester: cotton=50:50) at room temperature by using a printer of Seiko Epson Corp. (trade name PX-G930) to form a block image pattern with single colors being printed adjacent to each other at a resolution of 720 dpi×720 dpi. A bleed range of a color boundary portion of the obtained recorded matter was observed, and bleed resistance was evaluated according to the evaluation criteria described below.

Evaluation Criteria
A: A bleed range of a color boundary is less than 0.5 mm
B: A bleed range of a color boundary is equal to or more than 0.5 mm and less than 1 mm
C: A bleed range of a color boundary is 1 mm or more The entire disclosure of Japanese Patent Application No. 2014-187762, filed Sep. 16, 2014 is expressly incorporated by reference herein.

What is claimed is:

1. A printing ink composition comprising:
a disperse dye;
a surfactant;
a water soluble dye; and
a dispersant,
wherein the dispersant includes a formalin condensate of a lignin sulfonic acid,
an IOB value A of the disperse dye, an IOB value B of the surfactant, and an IOB value C of the water soluble dye satisfy the following Equation (1), $$A<B<C \qquad (1),\text{ and}$$

the IOB value B is 1.0 to 2.0.

2. The printing ink composition according to claim 1, wherein the surfactant includes two or more types of surfactants, and
a difference between the maximum IOB value B1 and the minimum IOB value B2 of the IOB values B which the two or more types of surfactants have is 0.10 to 1.0.

3. The printing ink composition according to claim 1, wherein a difference between the IOB value B and the IOB value A is at least 1.0 or less.

4. The printing ink composition according to claim 1, wherein the surfactant includes a nonionic surfactant.

* * * * *